Aug. 30, 1949.                    F. W. AVILA                    2,480,210
              MULTIRATIO DRIVE MECHANISM, ESPECIALLY
                  FOR THE AXLES OF MOTOR VEHICLES
Filed Oct. 5, 1946                                       2 Sheets-Sheet 2

INVENTOR.
Frank W. Avila
BY Paul O. Pippel
Atty

Patented Aug. 30, 1949

2,480,210

UNITED STATES PATENT OFFICE 2,480,210

MULTIRATIO DRIVE MECHANISM, ESPECIALLY FOR THE AXLES OF MOTOR VEHICLES

Frank W. Avila, Columbia City, Ind., assignor to International Harvester Company, a corporation of New Jersey Application October 5, 1946, Serial No. 701,490

7 Claims. (Cl. 74—695)

This invention relates to a multi-ratio drive mechanism, and more particularly to a mechanism of the type adapted for use in motor vehicles, or the like, to provide a final drive axle capable of driving the vehicle in a plurality of speed ranges.

In common practice, mechanisms of the type referred to above are known as two-speed rear axles. Various types of these multi-ratio mechanisms have been provided; some include change-speed gearing built directly into a rear axle housing, others include appropriate gearing provided in a housing attached to the rear axle housing, and others embody the provision of a separate housing providing an auxiliary transmission usually provided as an adjunct to the regular transmission of the vehicle.

The present invention pertains particularly to the class of mechanism referred to first above and has for one of its principal objects the provision of improved gearing that is compact in construction, efficient in operation and capable of being embodied within the final drive axle housing of the vehicle.

Other important objects of the invention are: To utilize internal-external gearing; to recess this gearing one within the other to the greatest possible extent; to provide improved bearing means for journaling the drive elements or gearing in the housing; and to provide shiftable dental clutch mechanism operable between the gearing and the final output drive member to provide for driving this member in, specifically, either one of two-speed ranges.

Figure 1:
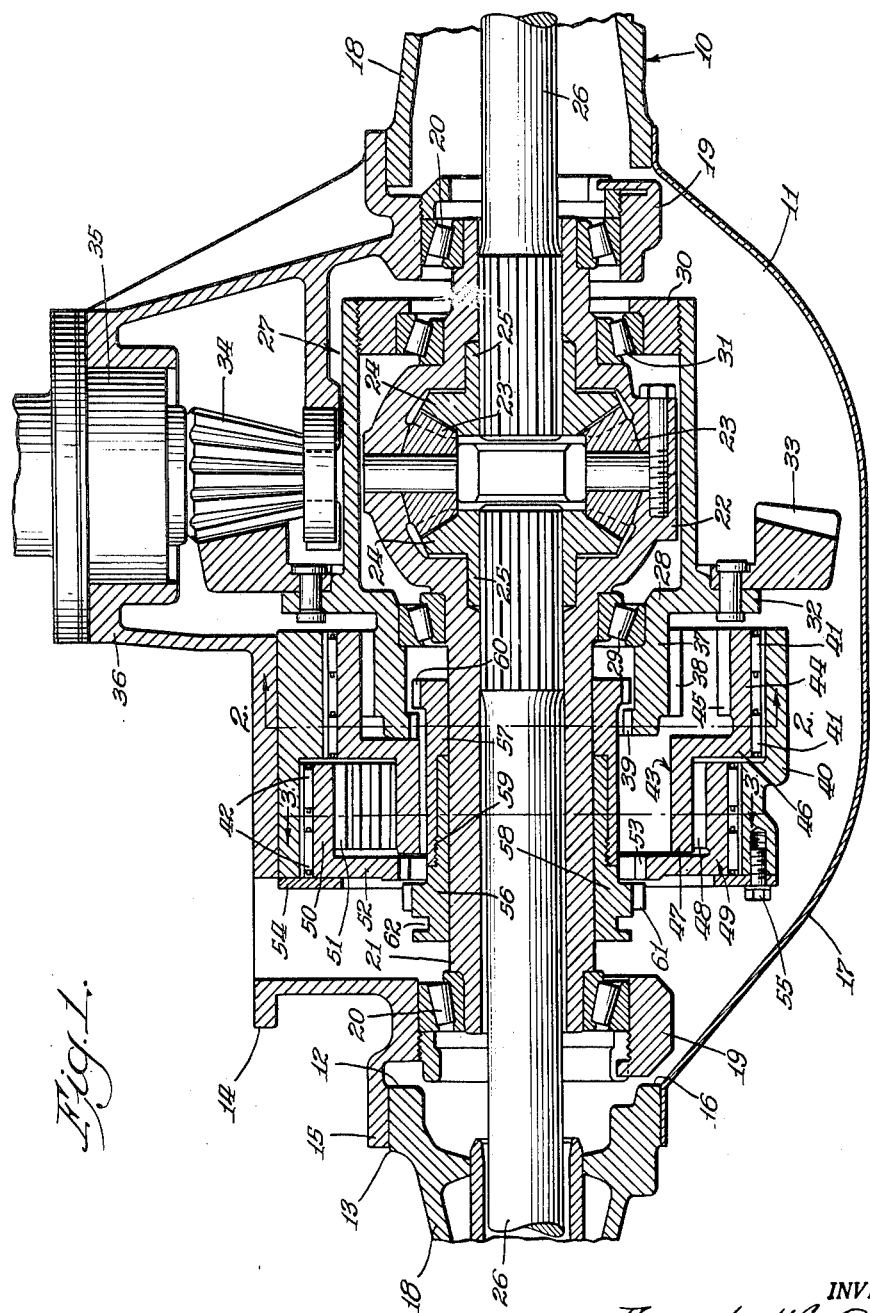
Figure 2:
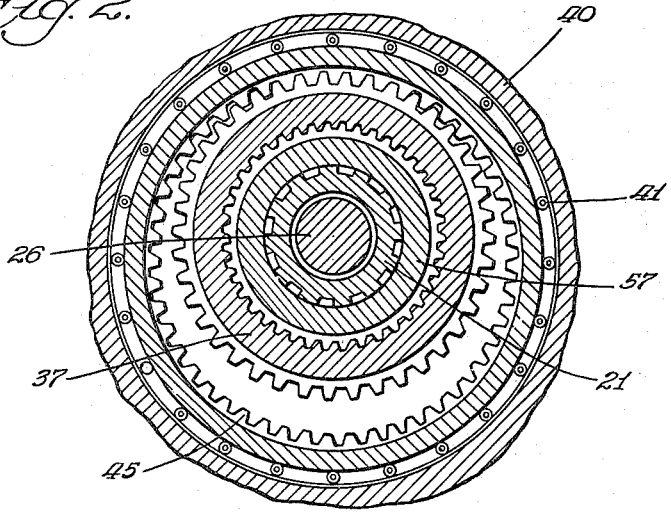
Figure 3:
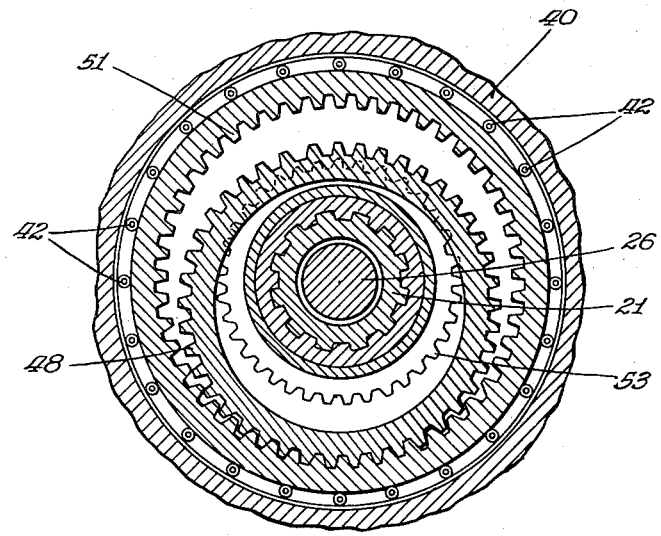

A complete understanding of the foregoing and other desirable objects and features of the invention may be had from the following detailed description of a preferred embodiment of the invention as illustrated in the accompanying sheets of drawings, in which:

Figure 1 is a horizontal transverse sectional view through the mechanism employed in the rear axle of a motor vehicle and embodying the multi-ratio gearing of the invention;

Figure 2 is a transverse sectional view taken in a vertical plane as viewed along the line 2—2 of Figure 1 and shows the relationship between the first units of the drive mechanism, together with a portion of the shiftable clutch member; and Figure 3 is a similar sectional view taken on the line 3—3 of Figure 1 and showing the relationship between the second pair of drive units, together with a portion of the shiftable clutch element.

Although the invention will be described and illustrated in connection with the rear axle of a motor vehicle, it should be understood that the various features and constructional details thereof will find application for other use of a similar nature.

In Figure 1 the reference numeral 10 indicates generally a rear axle housing of the type commonly found in motor vehicles. This structure includes an enlarged or "banjo" central housing portion 11 which contains the differential and dual ratio drive mechanism to be presently described. The forward face of the banjo housing is open as at 12 and is defined by a circular flange 13. When assembled with other component parts, the opening 12 is closed by a forward housing 14 having a circular flange 15 complementary to and mounted on the circular flange 13 of the banjo housing 11. The rear of the housing 11 is provided with a rear circular opening 16 closed in assembly by a generally hemispherical cover plate 17. Opposite, axially extending tubular housings 18 complete the housing structure 10.

The forward housing 14 includes a pair of spaced coaxial bearing supports 19 that project into the interior of the banjo housing 11. Each of these supports is provided with a suitable anti-friction bearing 20 in which are journaled respectively the opposite ends of a rotatable part in the form of a differential carrier 21. The differential carrier, insofar as its structure and design are concerned, is generally conventional and includes an intermediate enlarged housing portion 22 in which is mounted the differential mechanism comprising the sets of gears 23 and 24. Each of the gears 24 is provided with an internally splined hub 25, each of which receives the splined inner end of a driving shaft 26. The shafts extend respectively axially through the tubular axle housing portions 18 previously described.

The differential carrier 21 has rotatably mounted thereon a constantly driven rotating element 27. This element is in the form of a hollow cylinder concentrically encircling the enlarged intermediate portion 22 of the carrier 21 and is provided adjacent one end with an inwardly directed annular flange 28 which receives an anti-friction bearing 29 seated on the carrier 21. The opposite end of the element 21 is internally threaded and receives an externally threaded bearing seat 30 which receives an anti-friction bearing 31 mounted on the carrier 21 in axially spaced relation to the bearing 29.

The element 27 is provided at an external portion thereof, generally in alinement with the bearing 29, with a radially outwardly extending annular flange 32 on which is mounted a bevel ring gear 33. This ring gear is in constant mesh with a bevel pinion 34 journaled in a bearing 35 carried by a forward extension 36 of the forward housing 14. The pinion 34 is driven by the vehicle propeller shaft (not shown) in the usual manner and supplies power to the rear axle drive mechanism through the ring gear 33, differential mechanism 23—24 and a driving gear to be presently described.

The element 27 is provided, at the side thereof adjacent the bearing 29, with a coaxial annular cylindrical flange 37 of reduced diameter. This flange is, as shown, preferably formed integral with the element 27. The outer periphery of the flange 37 is formed with gear teeth to provide a driving gear 38. A portion of the inner periphery of the flange 37 is provided with internal clutch teeth to provide one element 39 of a dental clutch mechanism to be described below.

The forward housing 14 rigidly carries a supporting structure 40 that extends into the banjo housing 11 and encircles a substantial axial portion of the differential carrier 21 and associated driving parts as will presently appear. That portion of the supporting structure 40 that encircles the driving gear 38 is eccentric with respect to the driving gear and the axis of the differential carrier 21 and its inner cylindrical periphery is provided as a bearing surface containing a plurality of roller bearings 41, preferably in a double row. An adjacent portion of the interior of the supporting structure 40 is provided with an inner cylindrical bearing portion concentric with respect to the common axis of the differential carrier 21 and driving gear 38. This latter bearing portion is provided with a double row of roller bearings 42 similar to the roller bearings 41 just described.

A compound driving element designated generally by the numeral 43 is provided with a cylindrical portion 44, the external peripheral portion of which is journaled by the roller bearings 41 in the supporting structure 40. This portion 44 is, of course, concentric with respect to the proximate bearing portion of the supporting structure 40 and eccentric with respect to the axis of the carrier 21. The internal periphery of the portion 44 is formed with gear teeth to provide a driven gear 45, a portion of which is in constant mesh with the external driving gear 38 (Figures 1 and 2). The drive element 43 further includes a radially inwardly extending annular flange 46 which is preferably integral with the portion 44 and to which is integrally joined a cylindrical flange or portion 47 concentric with and of a diameter substantially less than that of the portion 44. This flange 47 is, of course, eccentric with respect to the axis of the differential carrier 21. The outer periphery of the cylindrical flange or portion 47 is formed with gear teeth to provide a second driving gear 48.

That portion of the supporting structure 40 provided with the roller bearings 42 journals a drive element designated generally by the numeral 49. This element is provided with a cylindrical external periphery concentric with respect to the axis of the carrier 21 and with respect to the pitch circle of the roller bearings 42. This element is, of course, eccentric with respect to the gears 45 and 48. The element 49 is formed generally as a cup having a hollow cylindrical portion 50 formed at its inner periphery with gear teeth to provide a second driven gear 51. The element also includes a radially inwardly extending annular flange 52 provided with a circular opening, the interior of which is formed with clutch teeth to provide a second dental clutch element 53 of the shiftable clutch mechanism to be described later. A ring 54 is secured to the end of the supporting structure 40 by a plurality of bolts 55 (only one of which is shown in Figure 1) to serve as a retainer for the drive elements 43 and 49.

That portion of the carrier 21 which is encircled by the drive gearing and supporting structure just described is externally splined to provide means on which an internally splined shiftable clutch member 56 is axially movable. The member 56 preferably comprises two portions 57 and 58 threaded together as at 59 to form a single unit. The inner end of the part 57 (or right-hand end as viewed in Figure 1) is provided with external clutch teeth 60 adapted to mesh with the internal teeth 39 on the rotatable element 27. The outer or left-hand end of the clutch part 58 is provided with external clutch teeth 61 adapted to mesh with the internal clutch teeth 53 of the element 49. An annular recess 62 is provided in the outer end of the clutch part 58 and provides means to be engaged by a shifter fork (not shown) for shifting the clutch member 56 axially on the differential carrier 21.

*Operation*

When it is desired to operate the drive mechanism in direct drive, the clutch member 56 is shifted to the left so that the external clutch teeth 60 thereon mesh with the internal clutch teeth 39 on the element 27. The differential carrier is then driven in direct drive by a line of power proceeding through the bevel pinion 34, the ring gear 33, the element 27, the clutch teeth 39 and 60, and the splined connection between the clutch member 56 and the carrier 21.

The power to the drive axles 26 may be increased by the gear reduction provided by the gearing 38, 45, 48 and 51. In this case the clutch member 56 (shown in neutral position in Figure 1) is shifted to the right so that the external clutch teeth 61 thereon mesh with the internal clutch teeth 53 on the drive element 49. The drive for the axles 26 now proceeds from the bevel pinion 34 through the ring gear 33, the drive element 27, the external gear 38, the internal eccentric gear 45, the external eccentric gear 48, the internal eccentric gear 51, and thence through the clutch mechanism 56 to the carrier 21, and from there through the differential gears 23 and 24 to the axles 26.

It will be seen from the foregoing description that the arrangement of reduction gearing is such that the over-all size of the rear axle housing is not excessively increased over that of the usual single ratio housing. Relatively few drive parts are provided and these are journaled in the housing by compactly arranged inexpensive bearings. It will be appreciated, of course, that this gearing may be otherwise journaled and that additional gearing may be provided to obtain additional gear ratios. It is not desired that this invention be limited to the exact details of construction shown and described, for the foregoing suggested modifications and other obvious modifications will occur to those skilled in the art.

What is claimed is:

1. In a multi-ratio axle drive mechanism for vehicles and the like having a differential carrier including differential gearing, a pair of drive axles coaxial with each other and with the carrier and extending from opposite sides of the carrier and connected to the differential gearing: means for driving the carrier and axles in any one of at least two speed ranges, comprising a constantly driven ring gear journaled on the carrier; an external driving gear coaxial with and secured to the ring gear at one side thereof for rotation therewith; a first internal driven gear eccentric with respect to and meshing with the driving gear; a second external driving gear coaxial with and secured to the first driven gear for rotation therewith; a second internal driven gear eccentric with respect to and meshing with the second driving gear; a clutch comprising components which are respectively constrained for rotation with the ring gear and the differential carrier; and a second clutch having components which are respectively constrained for rotation with the second driven gear and said differential carrier.

2. The combination set forth in claim 1 and in which: the last named two clutch means comprise internal toothed elements on the ring gear; internal toothed elements on the second driven gear; a member slidably connected to the differential carrier for rotation therewith and having first and second sets of external toothed elements thereon; and means for shifting said member axially with respect to the carrier for optionally engaging one set of external toothed elements with the internal toothed elements of the ring gear or the other set of external toothed elements with the internal toothed elements of the second driven gear.

3. In a multi-ratio axle drive mechanism for vehicles and the like having a differential carrier including differential gearing, a pair of drive axles coaxial with each other and with the carrier and extending from opposite sides of the carrier and connected to the differential gearing: means for driving the carrier and axles in any one of at least two speed ranges, comprising a first drive element journaled on the carrier; a ring gear encircling and secured to the element; means forming a concentric annular flange extending axially at one side of the element and including external gear teeth and internal clutch teeth; a second drive element having two connected, coaxial cylindrical portions of different diameters, the common axis of said portions being eccentric with respect to the axis of the first drive element; means on one of said portions forming internal teeth meshing with the aforesaid external teeth; means on the other of said portions forming external teeth thereon; a third drive element comprising a cup-shaped member eccentric with respect to the second drive element and having a cylindrical flange and an annular inwardly directed radial flange; means forming internal teeth on the cylindrical flange that mesh with the external teeth of the second drive element; means forming internal clutch teeth on the radial flange spaced axially from the internal clutch teeth on the first drive element; and means connected to the carrier for rotation therewith and including axially spaced sets of external clutch teeth, said means being shiftable axially on the carrier to optionally engage one set of external clutch teeth thereon with the internal clutch teeth of the first drive element or the other set with the internal clutch teeth on the radial flange of the third drive element.

4. A multi-ratio drive mechanism, comprising: a housing; a differential carrier in the housing; a pair of axially spaced carrier bearings journaling the carrier in the housing; a ring gear coaxial with and encircling the carrier; a pair of axially spaced ring gear bearings journaling the ring gear on the carrier, said second named bearing means being less widely spaced than the first bearing means; a first drive element in the form of a ring secured coaxially to the ring gear for rotation therewith at one side thereof substantially at the point where one side of the ring gear is supported by one of the aforesaid ring gear bearings; means forming both internal clutch teeth and external gear teeth on said drive element ring; a second drive element eccentric with respect to the first drive element and having two connected, coaxial ring portions of different diameters, the larger of which is formed internally with gear teeth meshing with the external teeth of the first drive element and externally with a bearing surface and the smaller of which is formed with external gear teeth; means carried by the housing for journaling the second drive element therein by means of said bearing surface; a third drive element in the form of a flanged ring eccentric with respect to the second drive element and having its outer periphery formed as a bearing surface and its interior formed with a set of internal gear teeth meshing with the external gear teeth on the second drive element, the flange on said third drive element being formed also with a set of internal clutch teeth; means carried by the housing for journaling the third drive element by means of the bearing surface thereon; and means, including external clutch teeth axially spaced and disposed on opposite sides of said second and third driving elements, for connecting the carrier optionally to either the set of internal clutch teeth on the third drive element or the internal clutch teeth on the first drive element.

5. A multi-ratio drive mechanism, comprising: a housing; a differential carrier in the housing; carrier bearings journaling the carrier in the housing; a ring gear coaxial with and encircling the carrier; ring gear bearings journaling the ring gear on the carrier; a first drive element in the form of a ring secured coaxially to the ring gear for rotation therewith at one side thereof; means forming both internal clutch teeth and external gear teeth on the ring; a second drive element eccentric with respect to the first drive element and having two connected, coaxial ring portions of different diameters, the larger of which is formed internally with gear teeth meshing with the external teeth of the first drive element and externally with a bearing surface and the smaller of which is formed with external gear teeth; means carried by the housing for journaling the second drive element therein by means of said bearing surface; a third drive element in the form of a flanged ring eccentric with respect to the second drive element and having its outer periphery formed as a bearing surface and its interior formed with a set of internal gear teeth meshing with the external gear teeth on the second drive element, the flange on said third drive element being formed also with a set of internal clutch teeth; means carried by the housing for journaling the third drive element by means of the bearing surface thereon; and means, including external clutch teeth axially spaced and disposed on opposite sides of said second and third driving elements, for connecting the carrier optionally to either the set of internal clutch teeth formed on the flange on the third drive element or the internal clutch teeth on the first drive element.

6. A multi-ratio drive mechanism, comprising: an external housing; a differential carrier in the housing; carrier bearings journaling the carrier in the housing; a ring gear coaxial with and encircling the carrier; ring gear bearings journaling the ring gear on the carrier; a first drive element in the form of a ring secured coaxially to the ring gear for rotation therewith at one side thereof; means forming external gear teeth on the ring; a second drive element eccentric with respect to the first drive element and having two connected, coaxial ring portions of different diameters, the larger of which is formed internally with gear teeth meshing with the external teeth of the first drive element and externally with a bearing surface, and the smaller of which is formed with external gear teeth; means carried by the external housing for journaling the second drive element therein by means of said bearing surface; a third drive element in the form of a ring eccentric with respect to the second drive element and having its outer periphery formed as a bearing surface and its interior formed with a set of internal gear teeth meshing with the external gear teeth on the second drive element; means carried by the external housing for journaling the third drive element by means of the bearing surface thereon; and means for connecting the carrier optionally to either the third drive element or the first drive element.

7. In a multi-ratio drive mechanism having a rotatable part: means for driving the rotatable part in any one of at least two speed ranges, comprising a constantly driven part journaled on the rotatable part; an external driving gear coaxial with and secured to the driven part at one side thereof for rotation therewith; a first internal driven gear eccentric with respect to and meshing with the driving gear; a second external driving gear coaxial with and secured to the first driven gear for rotation therewith; a second internal driven gear eccentric with respect to and meshing with the second driving gear; means for connecting the rotatable part directly to the constantly driven part; and means for connecting the rotatable part alternatively to the second driven gear; the said last named two means to comprise internal toothed elements on the constantly driven part, internal toothed elements on the second driven gear, and a member connected to the rotatable part for rotation therewith and having first and second sets of external toothed elements, said member being shiftable axially with respect to the rotatable part for optionally engaging one set of external toothed elements of the constantly driven part or the other set of external toothed elements with the internal toothed elements of the second driven gear.

FRANK W. AVILA.

REFERENCES CITED

The following references are of record in the file of this patent:

UNITED STATES PATENTS

| Number | Name | Date |
|---|---|---|
| 1,530,205 | Ruckstell | Mar. 17, 1925 |
| 2,046,282 | Wert | June 30, 1946 |
| 2,426,593 | Buckendale | Sept. 2, 1947 |